United States Patent
Huang

(10) Patent No.: US 11,190,034 B2
(45) Date of Patent: Nov. 30, 2021

(54) CHARGING STAND, QUICK-RELEASE ASSEMBLY, AND METHOD OF MOUNTING AND DEMOUNTING THE QUICK-RELEASE ASSEMBLY

(71) Applicant: GETAC TECHNOLOGY CORPORATION, Hsinchu County (TW)

(72) Inventor: Tzu-Chiu Huang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 211 days.

(21) Appl. No.: 16/367,172

(22) Filed: Mar. 27, 2019

(65) Prior Publication Data

US 2020/0067330 A1    Feb. 27, 2020

Related U.S. Application Data

(60) Provisional application No. 62/720,388, filed on Aug. 21, 2018.

(51) Int. Cl.
*H02J 7/00* (2006.01)

(52) U.S. Cl.
CPC .......... *H02J 7/0045* (2013.01); *H02J 7/0003* (2013.01); *H02J 7/00047* (2020.01); *H02J 7/0042* (2013.01)

(58) Field of Classification Search
CPC ...... H02J 7/0042; H02J 7/0045; H02J 7/0003; H02J 7/00047
USPC ................................... 320/107, 110, 113, 115
See application file for complete search history.

(56) References Cited

U.S. PATENT DOCUMENTS

| | | | | |
|---|---|---|---|---|
| 4,558,270 A | * | 12/1985 | Liautaud | H02J 7/0045 320/110 |
| 5,280,229 A | * | 1/1994 | Faude | H02J 7/0045 320/110 |
| 5,926,005 A | * | 7/1999 | Holcomb | H02J 7/0042 320/113 |
| 6,014,010 A | * | 1/2000 | Yao | H02J 7/0045 320/110 |
| 6,042,414 A | * | 3/2000 | Kunert | H01R 13/6272 248/310 |
| 2001/0017531 A1 | * | 8/2001 | Sakakibara | H02J 7/00036 320/106 |
| 2002/0115480 A1 | * | 8/2002 | Huang | H02J 7/0013 455/573 |
| 2006/0250764 A1 | * | 11/2006 | Howarth | G06F 1/1632 361/679.41 |
| 2008/0150480 A1 | * | 6/2008 | Navid | H01R 31/06 320/113 |
| 2011/0134601 A1 | * | 6/2011 | Sa | G06F 1/1632 361/679.43 |

* cited by examiner

*Primary Examiner* — Edward Tso
*Assistant Examiner* — Aaron Piggush

(57) ABSTRACT

A charging stand includes a casing and a quick release assembly. The casing includes a first sidewall, a second sidewall, and a bottom plate. The first and second sidewalls are disposed oppositely and connected to two edges of the bottom plate, respectively, to form a receiving chamber. The quick release assembly includes a body and a fixing element. When the quick release assembly is demountably disposed in the receiving chamber, the fixing element is engagedly disposed on the bottom plate.

8 Claims, 7 Drawing Sheets

CHARGING STAND, QUICK-RELEASE ASSEMBLY, AND METHOD OF MOUNTING AND DEMOUNTING THE QUICK-RELEASE ASSEMBLY

CROSS-REFERENCE TO RELATED APPLICATIONS

The present application claims the benefit of U.S. provisional Patent Application No. 62/720,388, filed on Aug. 21, 2018, the disclosure of which is hereby incorporated by reference herein in its entirety.

BACKGROUND OF THE INVENTION

Field of the Invention

The present disclosure relates to charging stands, quick-release assemblies, and methods of mounting and demounting the quick-release assemblies and, more particularly, to a charging stand for use by batteries of various sizes, a quick-release assembly, and a method of mounting and demounting the quick-release assembly.

Description of the Prior Art

Batteries are standard accessories for conventional mobile devices. Users often match various batteries to charging stands with various battery slots and thus purchase chargers of different specifications, respectively.

SUMMARY OF THE INVENTION

In view of this, it is an objective of the present disclosure to provide a charging stand, a quick-release assembly, and a method of mounting and demounting the quick-release assembly.

A charging stand according to an embodiment of the present disclosure comprises a casing and a quick-release assembly. The casing has a first sidewall, a second sidewall, and a bottom plate, wherein the first and second sidewalls are disposed oppositely and connected to two edges of the bottom plate, respectively, to form a receiving chamber. The quick-release assembly comprises a body and a fixing element. The fixing element is engagedly disposed on the bottom plate when the quick-release assembly is demountably disposed in the receiving chamber.

A quick-release assembly according to another embodiment of the present disclosure is adapted to be demountably mounted in a receiving chamber and comprises a body and a fixing element. The body is positioned proximate to a second sidewall of the receiving chamber. The fixing element extends from the body and is adapted to be engagedly disposed on a bottom plate of the receiving chamber.

A method of mounting and demounting a quick-release assembly according to yet another embodiment of the present disclosure comprises the steps of: providing a casing having a first sidewall, a second sidewall, and a bottom plate, wherein the first and second sidewalls are disposed oppositely and connected to two edges of the bottom plate, respectively, to form a receiving chamber; inserting a fixing element of a quick-release assembly at an angle relative to the second sidewall until the fixing element reaches the bottom plate or withdrawing the fixing element from the bottom plate at an angle relative to the second sidewall; and switching the quick-release assembly between a mounted position and a demounted position by using the fixing element as a point of support, wherein at the mounted position the body and the second sidewall engage with each other and are parallel, and at the demounted position the body moves away from the second sidewall at an angle relative thereto.

Objectives, features, and advantages of the present disclosure are hereunder illustrated with specific embodiments, depicted with drawings, and described below.

DETAILED DESCRIPTION OF THE EMBODIMENTS

Figure 1:
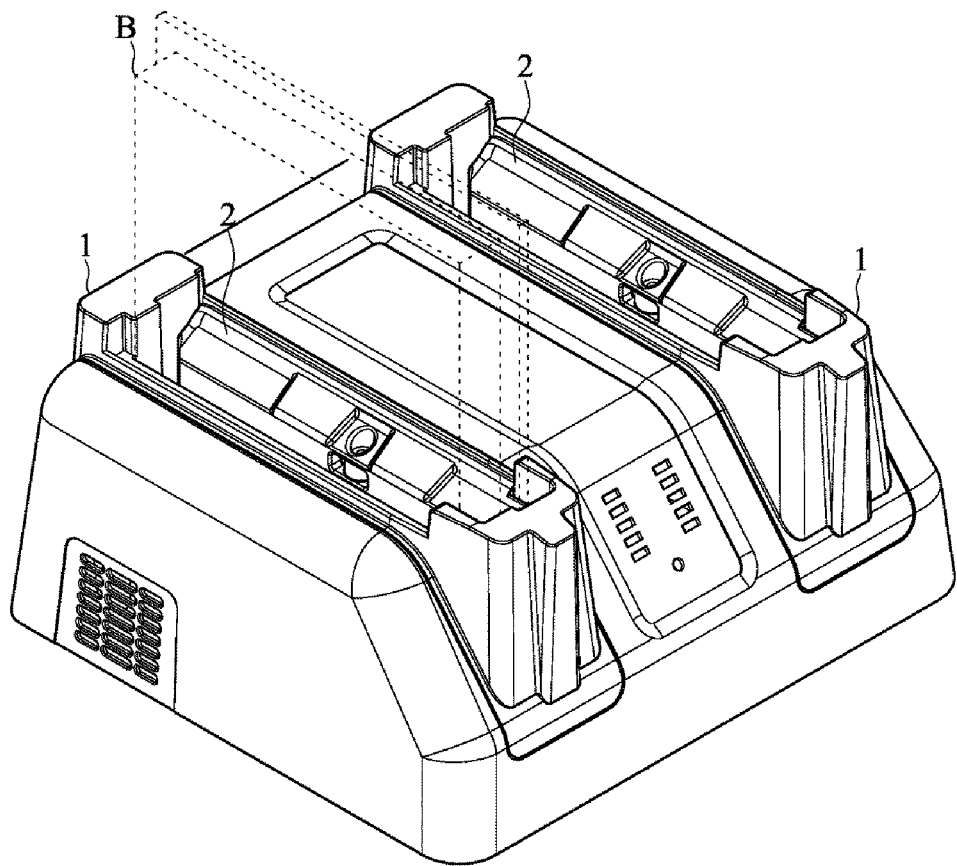
FIG. 1 is a perspective view of a charging stand system according to an embodiment of the present disclosure.

Referring to FIG. 1, a charging stand system according to an embodiment of the present disclosure comprises at least a charging stand for receiving at least a battery B, wherein the charging stand comprises a casing 1 and a quick-release assembly 2.

Figure 2:
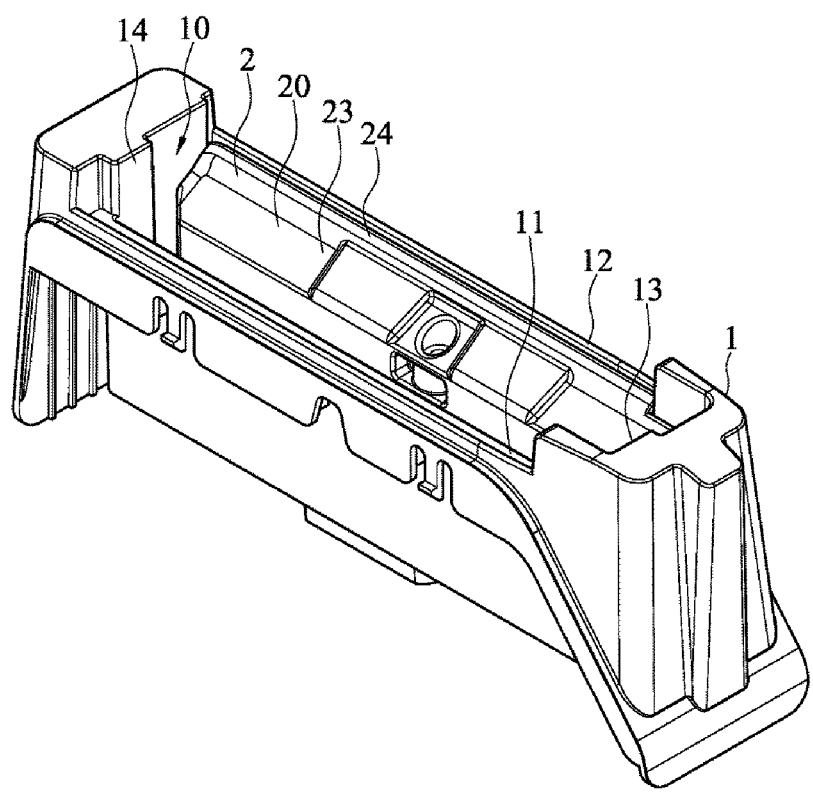
FIG. 2 is a perspective view of a charging stand according to an embodiment of the present disclosure.
Figure 3:
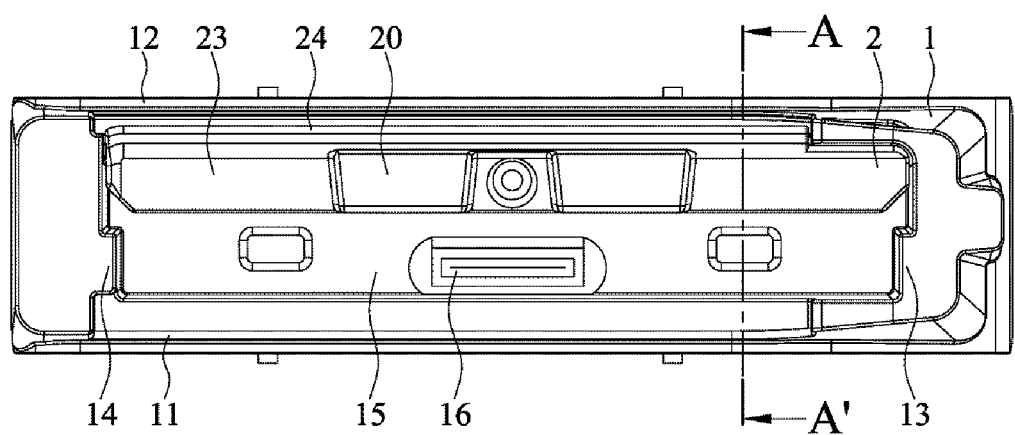
FIG. 3 is a top view of the charging stand according to an embodiment of the present disclosure.

Referring to FIG. 2 and FIG. 3, in this embodiment, the casing 1 comprises a receiving chamber 10 for receiving a battery. The receiving chamber 10 is concavely disposed in the casing 1. The receiving chamber 10 is defined by a bottom plate 15, a first sidewall 11 and a second sidewall 12. The first sidewall 11 and the second sidewall 12 are connected to two edges of the bottom plate 15, respectively, and disposed oppositely. For instance, the receiving chamber 10 is defined by a first sidewall 11, a second sidewall 12, a third sidewall 13, a fourth sidewall 14 and a bottom plate 15. The first sidewall 11 and the second sidewall 12 are connected to two edges of the bottom plate 15, respectively, and disposed oppositely. The third sidewall 13 and the fourth sidewall 14 are connected to the first sidewall 11 and the second sidewall 12, respectively; hence, the third sidewall 13 and the fourth sidewall 14 are connected to the two other edges of the bottom plate 15, respectively, and disposed oppositely, so as to form the receiving chamber 10 concavely disposed in the casing 1. Regarding the design of the receiving chamber 10, out of various corresponding battery specifications, the one with the greatest size is selected to design the capacity of the receiving chamber 10.

A connector 16 is disposed on the bottom plate 15. The connector 16 is positioned proximate to the first sidewall 11. A battery is connected to the connector 16 in the receiving chamber 10 and charged through the connector 16. The connectors are designed to correspond in position to the battery ends of the receiving chambers for all types of batteries; in other words, all types of batteries share the connector 16 of the charging stand.

Figure 4:
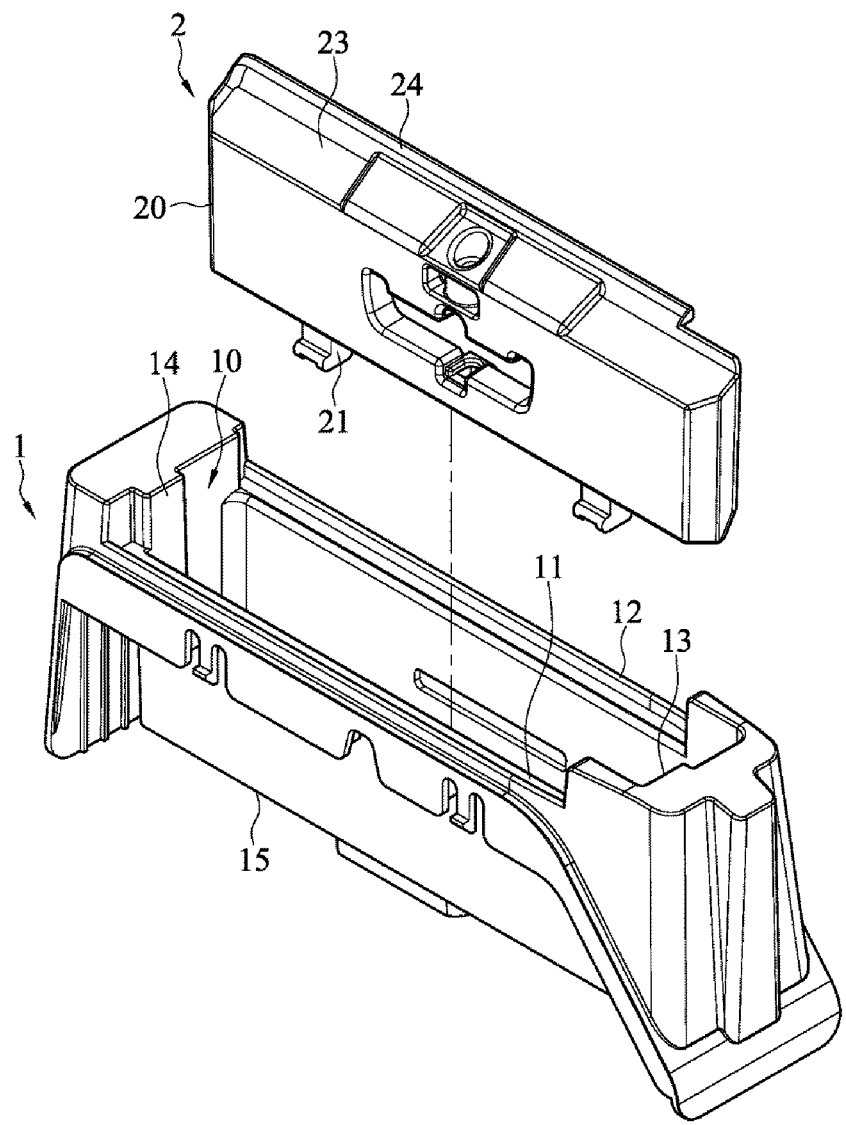
FIG. 4 is an exploded view of the charging stand according to an embodiment of the present disclosure.
Figure 5:
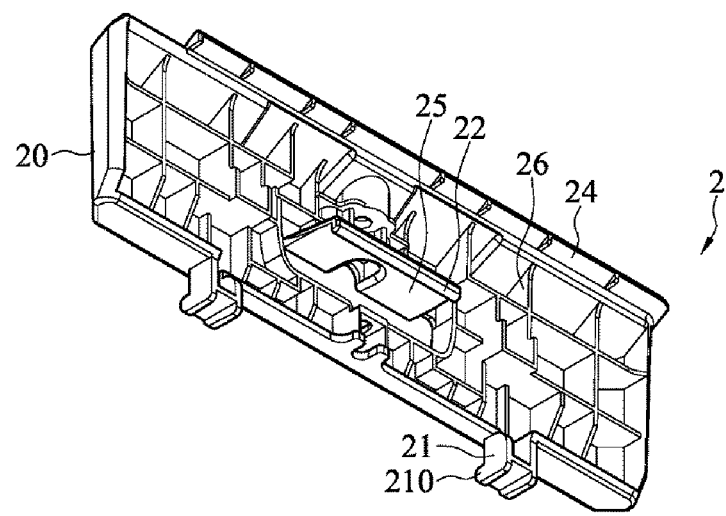
FIG. 5 is a schematic view of a quick-release assembly according to an embodiment of the present disclosure.

Referring to FIG. 4 and FIG. 5, in this embodiment, the quick-release assembly 2 comprises a body 20 and at least a fixing element 21. The fixing element 21 extends from the lower edge of the body 20 in a direction away from the body 20 and is adapted to be engagedly disposed on the bottom plate 15 of the receiving chamber 10. For instance, the fixing element 21 has a fastening portion 210 protrudingly disposed on the outer side of the fixing element 21.

The body 20 is positioned proximate to the second sidewall 12 of the receiving chamber 10. The body 20 comprises an extending portion 23 and an operating portion 24. Two opposing edges of the extending portion 23 are connected to a side of the body 20 and the operating portion 24, respectively, wherein the side of the body 20 is positioned distal to the fixing element 21; hence, the extending portion 23 is disposed between the body 20 and the operating portion 24. For instance, the extending portion 23 extends from the body 20 at an angle relative to the body 20 so as to connect to the operating portion 24.

The operating portion 24 engages with the second sidewall 12. The second sidewall 12 and the body 20 are parallel. The fixing element 21 is engagedly disposed on the bottom plate 15. Hence, the quick-release assembly 2 is disposed in the receiving chamber 10. In at least an embodiment, two edges of each of the two opposing sides of the body 20 abut against the third sidewall 13 and the fourth sidewall 14 such that the quick-release assembly 2 is firmly mounted in the receiving chamber 10, as shown in FIG. 3.

Referring to FIG. 4 and FIG. 5, in this embodiment, the quick-release assembly 2 further comprises an engaging hook 22. The engaging hook 22 extends from one side of the body 20 and is adapted to engage with the second sidewall 12 of the receiving chamber 10. For instance, a cantilever 25 of the engaging hook 22 and the fastening portion 210 extend in opposite directions. The engaging hook 22 engages with the second sidewall 12, whereas the fastening portion 210 engages with the bottom plate 15 of the receiving chamber 10, when the quick-release assembly 2 is disposed in the receiving chamber 10. The quick-release assembly 2 further comprises a plurality of reinforcing ribs 26 extending from the body 20. A plurality of reinforcing ribs 26 is disposed on one side of the body 20, wherein the side of the body 20 faces the second sidewall 12, when the quick-release assembly 2 is disposed in the receiving chamber 10. Hence, the quick-release assembly 2 is reinforced to thereby prevent the body 20 from deformation which might otherwise lead to poor mounting.

Since battery size specifications depend on mobile device model numbers, the quick-release assembly 2 of the charging stand in this embodiment is demountably disposed in the receiving chamber 10 and adaptively adjusts the geometric shape and size of the space of the receiving chamber 10, thereby allowing the receiving chamber 10 to receive batteries of different specifications. Therefore, the quick-release assembly 2 of the charging stand in this embodiment meets the charging requirements of different battery specifications, shares the same charging stand, and spares users the need to purchase various chargers of different specifications.

Figure 6:
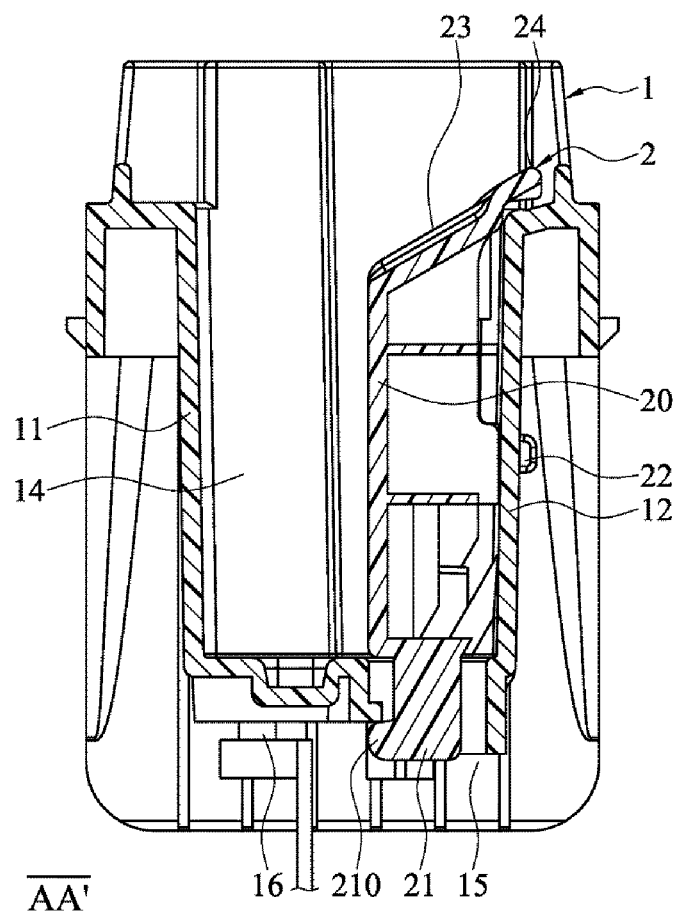
FIG. 6 is a cross-sectional view of the charging stand taken along line AA' in FIG. 3 according to an embodiment of the present disclosure.
Figure 7:
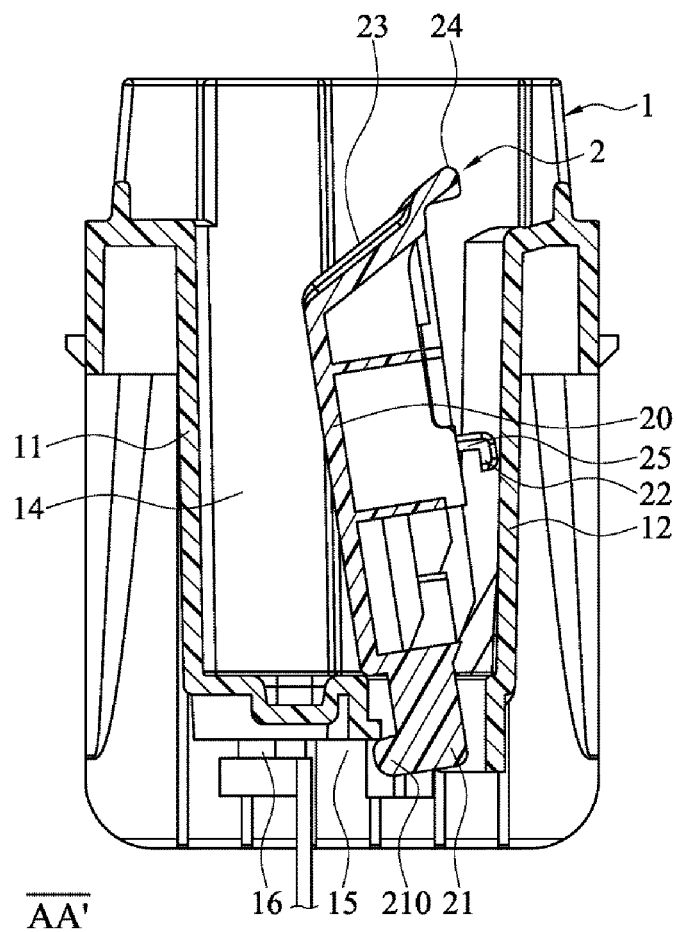
FIG. 7 is a cross-sectional view of the charging stand taken along line AA' in FIG. 3 according to an embodiment of the present disclosure.

A method of mounting and demounting a quick-release assembly in yet another embodiment of the present disclosure is described below. Referring to FIG. 6 and FIG. 7, there are shown cross-sectional views of the charging stand taken along line AA' in FIG. 3 according to an embodiment of the present disclosure. The method entails providing a charging stand. Features of the constituent components of the charging stand, their connections, advantages, and related embodiments are described before.

To mount the quick-release assembly 2 in place, a user inserts the fixing element 21 of the quick-release assembly 2 at an angle relative to the second sidewall 12 into the receiving chamber 10 to reach the bottom plate 15, as shown in FIG. 7. Features of the constituent components of the quick-release assembly 2, their connections, advantages, and related embodiments are described before.

Afterward, the user pushes the quick-release assembly 2, using the fixing element 21 of the quick-release assembly 2 as a point of support and using the operating portion 24, such that the quick-release assembly 2 engages with the second sidewall 12, as shown in FIG. 7. When the operating portion 24 engages with the second sidewall 12, as shown in FIG. 6, the quick-release assembly 2 is at a mounted position. With the quick-release assembly 2 being confined to one side of the receiving chamber 10, the user can push the quick-release assembly 2 by hand intuitively, thereby achieving quick mounting and enhanced structural stability.

Conversely, to demount the quick-release assembly 2, the user pushes the quick-release assembly 2, using the fixing element 21 as a point of support and using the operating portion 24, such that the quick-release assembly 2 gets positioned distal to the second sidewall 12, as shown in FIG. 7. At this point in time, the quick-release assembly 2 is at the demounted position.

Afterward, the user withdraws the fixing element 21 of the quick-release assembly 2, at an angle relative to the second sidewall 12, from the bottom plate 15 of the receiving chamber 10, as shown in FIG. 7.

Therefore, the quick-release assembly 2 switches between a mounted position and a demounted position, using the fixing element 21 as a point of support. For instance, at the mounted position, the body 20 of the quick-release assembly 2 and the second sidewall 12 engage with each other and are parallel such that the quick-release assembly 2 is mounted in the receiving chamber 10. For instance, at the demounted position, the body 20 of the quick-release assembly 2 moves away from the second sidewall 12 at an angle relative thereto. With the quick-release assembly 2 being confined to one side of the receiving chamber 10, a user can insert or withdraw the quick-release assembly 2 by hand intuitively, to thereby mount or demount the quick-release assembly 2 easily and adaptively adjust the geometric shape and size of the space of the receiving chamber 10, thereby allowing the receiving chamber 10 to receive batteries of different specifications. Furthermore, the quick-release assembly 2 has advantages as follows: easy and quick mounting and demounting, and structurally stable.

In conclusion, embodiments of the present disclosure provide a charging stand, a quick-release assembly and a method of mounting and demounting a quick-release assembly, which involve enabling the quick-release assembly to be demountably disposed in a receiving chamber and adaptively adjusting the geometric shape and size of the space of the receiving chamber, thereby allowing the receiving chamber to receive batteries of different specifications. With the quick-release assembly being confined to one side of the receiving chamber, a user can quickly demount and change the quick-release assembly by oneself and single-handedly; hence, charging stands with the same connectors can be quickly dismantled and changed to charging stand of different battery specifications to thereby spare users the need to purchase various charging stands of different specifications. Therefore, the present disclosure has advantages as follows: single-handed operation, quick dismantling and changing, and enhanced structural stability.

Although the present disclosure is disclosed by the aforesaid embodiments, the embodiments are not restrictive of the present disclosure. Some changes and modifications may be made by persons skilled in the art to the embodiments without departing from the spirit and scope of the present disclosure. Accordingly, the legal protection for the present disclosure should be defined by the appended claims.

What is claimed is:

1. A charging stand, comprising:
    a casing having a first sidewall, a second sidewall, and a bottom plate, wherein the first and second sidewalls are disposed oppositely and connected to two edges of the bottom plate, respectively, to form a receiving chamber; and
    a quick-release assembly comprising a body and a fixing element, wherein the fixing element is engagedly disposed on the bottom plate when the quick-release assembly is disposed in the receiving chamber in a mounted position, arranged such that when the quick-release assembly is in the mounted position, a gap remains between the quick-release assembly and the first sidewall, wherein the gap is proportioned for receiving a battery;
    wherein the casing and quick release assembly are arranged such that the quick-release assembly is movable between the mounted position in which the body and the second sidewall abut and in which the fixing element is engaged with the bottom plate, and a demounted position in which the body tilts away from the second sidewall and the fixing element is disengaged from the bottom plate, wherein the quick-release assembly is interior to the receiving space in both the mounted and the demounted positions.

2. The charging stand of claim 1, wherein the receiving chamber further comprises a third sidewall and a fourth sidewall which are disposed oppositely and connected to the first sidewall and the second sidewall, respectively, such that the body abuts against the third sidewall and the fourth sidewall when the quick-release assembly is disposed in the receiving chamber.

3. The charging stand of claim 1, wherein the quick-release assembly further comprises a plurality of reinforcing ribs extending from the body such that the plurality of reinforcing ribs is disposed on the body in such a manner to face the second sidewall when the quick-release assembly is disposed in the receiving chamber.

4. The charging stand of claim 1, wherein the quick-release assembly further comprises an engaging hook extending from the body such that the engaging hook engages with the second sidewall when the quick-release assembly is in the mounted position.

5. The charging stand of claim 4, wherein the fixing element comprises a fastening portion such that the fastening portion and a cantilever of the engaging hook extend in opposite directions, respectively.

6. The charging stand of claim 1, wherein the quick-release assembly further comprises an extending portion and an operating portion, the extending portion having two opposing edges connected to a side of the body and the operating portion, respectively, wherein the side of the body is positioned distal to the fixing element, wherein the operating portion engages with the second sidewall when the quick-release assembly is disposed in the receiving chamber.

7. The charging stand of claim 6, wherein the extending portion extends from the body at an angle relative to the body.

8. A method of mounting and demounting a quick-release assembly, comprising the steps of:
    providing a casing having a first sidewall, a second sidewall, and a bottom plate, wherein the first and second sidewalls are disposed oppositely and connected to two edges of the bottom plate, respectively, to form a receiving chamber;
    inserting a fixing element of a quick-release assembly at an angle relative to the second sidewall until the fixing element reaches the bottom plate;
    moving the quick-release assembly to a mounted position in which a body of the quick-release assembly and the second sidewall engage with each other and are parallel and in which the fixing element is engaged with the bottom plate, wherein when the quick-release assembly is in the mounted position a gap remains between the body of the quick-release assembly and the first sidewall, wherein the gap is proportioned for receiving a battery; and
    switching the quick-release assembly between the mounted position and a demounted position by using the fixing element as a point of support, and at the demounted position the body moves away from the second sidewall at an angle relative thereto and the fixing element is disengaged from the bottom plate.

* * * * *